(12) United States Patent
Jakobs et al.

(10) Patent No.: US 10,670,717 B2
(45) Date of Patent: Jun. 2, 2020

(54) ULTRASONIC DOPPLER MOTION SENSOR DEVICE

(71) Applicant: Steinel GmbH, Herzebrock-Clarholz (DE)

(72) Inventors: Dirk Jakobs, Beelen (DE); Marcel Thiele, Rheda-Wiedenbrück (DE)

(73) Assignee: Steinel GmbH, Herzebrock-Clarholz (DE)

( * ) Notice: Subject to any disclaimer, the term of this patent is extended or adjusted under 35 U.S.C. 154(b) by 0 days.

(21) Appl. No.: 16/075,207

(22) PCT Filed: Jul. 11, 2017

(86) PCT No.: PCT/EP2017/067384
§ 371 (c)(1),
(2) Date: Aug. 3, 2018

(87) PCT Pub. No.: WO2018/011197
PCT Pub. Date: Jan. 18, 2018

(65) Prior Publication Data
US 2019/0129029 A1 May 2, 2019

(30) Foreign Application Priority Data
Jul. 14, 2016 (DE) .................... 10 2016 113 024

(51) Int. Cl.
*G01S 15/52* (2006.01)
*G01S 7/534* (2006.01)

(52) U.S. Cl.
CPC ............ *G01S 15/523* (2013.01); *G01S 7/534* (2013.01)

(58) Field of Classification Search
CPC ........ G01S 15/523; G01S 7/534; G01S 15/06; G01S 15/32; G01S 13/56; G01S 13/88; G01S 13/86
See application file for complete search history.

(56) References Cited

U.S. PATENT DOCUMENTS 5,986,357 A * 11/1999 Myron ............... G06K 9/00335
307/116
6,248,068 B1 * 6/2001 Seabron .................. G01S 15/52
600/437
(Continued)

FOREIGN PATENT DOCUMENTS

| AT | 413450 B | 3/2006 |
| DE | 4344500 C1 | 3/1995 |
| JP | 2015021829 A | 2/2015 |

OTHER PUBLICATIONS

International search report for patent application No. PCT/EP2017/067384 dated Oct. 27, 2017.

*Primary Examiner* — An T Nguyen
(74) *Attorney, Agent, or Firm* — Bachman & LaPointe, PC

(57) ABSTRACT

An ultrasonic doppler motion sensor device includes a transmitter (10, 12) for emitting a continuous ultrasonic transmission signal in a detection space, an ultrasonic receiver (20, 22) for detecting the ultrasonic transmission signal reflected by the detection object as a receive signal, and a mixer and detector (14, 18) for mixing the ultrasonic transmission signal or a signal derived therefrom with the receive signal and/or for demodulating the receive signal and for generating a motion detection signal therefrom, wherein the mixer and detector are assigned a system (14) for the adjustable generation of a phase shift greater than 0° between a phase of the ultrasonic transmission signal and a periodic impulse signal at the mixer or detector for scanning and mixing the receive signal.

13 Claims, 2 Drawing Sheets

(56) References Cited

U.S. PATENT DOCUMENTS

2010/0152600 A1\* 6/2010 Droitcour ................ A61B 5/05
  600/534
2014/0241125 A1\* 8/2014 Mugiuda ............... G01S 15/523
  367/94

\* cited by examiner

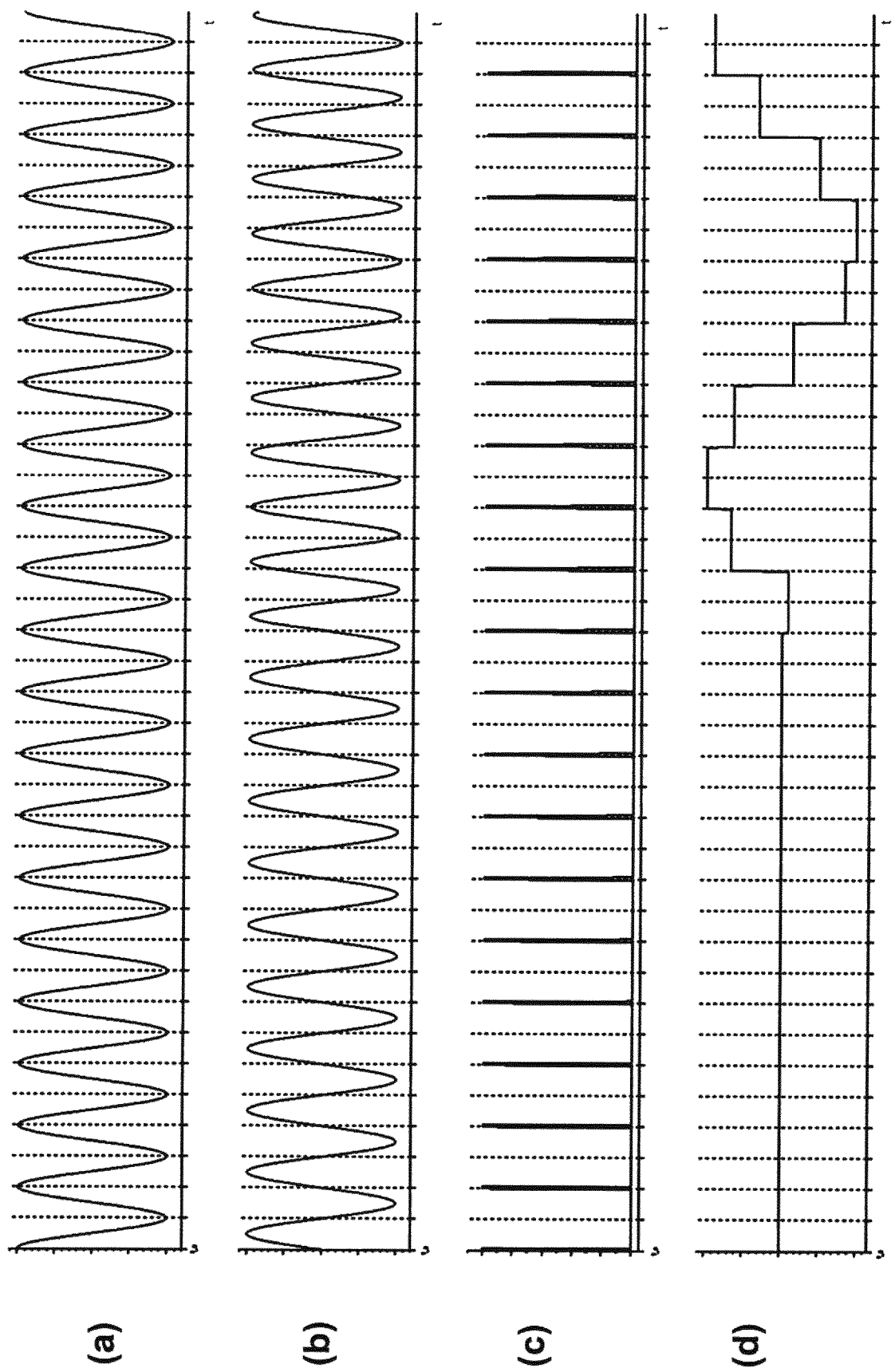

ULTRASONIC DOPPLER MOTION SENSOR DEVICE

BACKGROUND OF THE INVENTION

The present invention relates to an ultrasound Doppler motion sensor assembly according to the preamble of the main claim. The invention further relates to the use of such a motion sensor device.

Generally known from prior art are ultrasound Doppler motion sensor devices according to the preamble of the main claim. The latter are usually used in an interior space, in particular for purposes of controlling illumination in response to the detected motion, wherein a continuous transmission signal having a typical carrier frequency of approx. 40 kHz radiated (emitted) by the transmitting means is reflected by an object moving in the detection space, the reflected signal is received by the ultrasound reception means, after which mixer and detector means are used to determine a Doppler frequency that depends on a speed of motion of the detection object within the framework of demodulating the reception signal, and evaluate it for the desired motion detection. Filtration usually takes place to make only (e.g., human) motions accessible to detection within a desired frequency window.

Such an ultrasound Doppler technology used for motion sensor purposes has proven itself for numerous years, is suitable for mass production, and has a long service life, so that this technology has become widely disseminated with emphasis on interior spaces, not least because it can be cost-effectively realized via simple and uncritical assembly in conjunction with low component costs. However, this type of known technology also has its problems during everyday operations. For example, the ultrasound transmission signal can only be prevented from being parasitically coupled into the ultrasound reception means with a great technical outlay, in particular given a spatial proximity of the respective ultrasound units in a shared sensor housing. A too strong feedback has a negative impact on a (maximum) motion sensor range, and can even lead to a complete failure of the generic sensor technology.

Another disadvantage to the known technology, in particular when using a plurality of generic ultrasound Doppler motion devices in a shared room or in the area of respective (adjacent) sensors, has to do with undesired influences on the respective adjacent devices, up to and including erroneous detections and erroneous activations. The cause of this problem lies in the fact that, given (usually quartz-controlled) ultrasound oscillators, the signals of adjacently provided or mounted sensor assemblies are so close to each other in the frequency range that a reception part of a first unit can misinterpret a transmission signal of a second unit as a motion detector signal.

Finally, a general problem (and one that also leads to erroneous activations in the present context of motion sensors) is that pressure fluctuations in the ambient air cannot always be avoided, and likewise cause disturbances.

SUMMARY OF THE INVENTION

Therefore, the object of the present invention is to create an ultrasound Doppler motion sensor assembly that is able to optimally avoid or reduce the outlined problem areas, specifically undesired feedback from transmission means into the reception means, undesired influences of adjacent ultrasound motion sensors in a shared or overlapping detection space, along with detrimental damaging influences by fluctuations in the ambient air pressure, so that in particular the detection quality of generic sensor assemblies can be optimized in conjunction with the largest possible detection space given a high level of insensitivity to disturbances.

The object is achieved with the ultrasound Doppler motion sensor assembly having the features of the main claim; advantageous further developments of the invention are described in the subclaims. Additional protection within the framework of the invention is claimed for a use of the motion sensor device according to the invention for lamp and illumination control, wherein this use reflects a preferred application of the technology according to the invention, without being limited to this application.

In an inventively advantageous way, the mixer and detector means have allocated to them means for adjustably generating a phase shift between a phase of the (e.g., sinusoidal) continuous ultrasound transmission signal and a periodic pulse signal applied to the mixer for demodulation, such that this phase shift (phase displacement) is greater than 0°. Since both the (continuous, periodic) transmission signal and the pulsed scanning signal can also have the same frequency e.g., 40 kHz in the present field of ultrasound detector technology—an identical frequency of these signals is not required. Within the framework of the invention, however, the realized phase shift ensures that a disturbance caused by a feedback or inadvertent coupling of the transmission signal into the reception signal can be effectively prevented: In this way, a transmission signal parasitically coupled or fed back into the reception part would be in phase with the latter; as a consequence, the inventively generated phase shift of the pulse signal scanning the reception signal does not take these disturbances into account.

Within the framework of preferred further developments of the invention, this phase shift is also easy to realize; specifically, in the present realization context, programming or a software solution was used to realize this phase shift based upon suitably digitized signals within the framework of a microcontroller or microprocessor environment, so that the inventive means for generating the phase shift can be easily implemented as part of the control unit provided by the further development. The actual mixing process then takes place in the form of a mixer, which is realized in discrete time and clocked by a microcontroller, and can be realized either with discrete components or alternatively by the microcontroller itself. Usually provided within the framework of realizations of the invention that are suitable for mass production in particular vibration generators are provided that can be realized by means of a quartz oscillator or quartz stabilizer, which can be used both on the transmitting and receiving (demodulator) side.

In this regard, a possible further development of the invention then provides that the stabilization or oscillator frequency of such a vibration generator can be detuned, for example by manually adjustable components in the resonant circuit, additionally or alternatively by software routines provided within the framework of the microcontroller- or microprocessor-realized control unit. Such a detuning that can be provided in a targeted manner for a respective product of the ultrasound Doppler motion sensor device, typically on the order of 100 Hz for the ultrasound carrier frequencies typically present here, then elegantly eliminates an undesired influence of an adjacent motion sensor, for example in a shared space (and hence in an overlapping detection space). Alternatively, and in particular within the framework of an inventive system concept for a present ultrasound Doppler motion sensor assembly of the present invention to be mounted in a shared space or ceiling area with the possibility of reciprocal influence, it is provided that the respective oscillators be set up by selecting the respective (stabilization) quartzes in such a way that the latter lie very close to each other in terms of their oscillator frequencies, up to and including within a single-digit or double-digit Hz range. The mixture signals or reciprocal influence of the adjacent ultrasound Doppler motion sensor assemblies then yield beat frequencies with a correspondingly low frequency, which can then be easily and reliably filtered out, and thus eliminated, in particular during subsequent signal processing. In the practice of operating several devices according to the invention, this actually resulted in a situation where, due to absolutely higher ultrasound signal levels in the respective space through overlapping, a higher reception level is actually present at the individual receivers, thus making it possible to improve the motion sensitivity. As a consequence, this measure also yields a potential expansion of the detection or acquisition range of the motion sensor(s) according to the invention.

As is important in practical realization, the inventive measures for generating the phase shift have a zero crossing detector, which detects any respective zero crossings of the periodic (sinusoidal), continuous ultrasound transmission signal, and can then use these zero crossings as the basis for the inventive phase shift (which can also take place computationally). In a manner favorable in terms of manufacturing and vibrations, the transmission means then contain units for keeping the phase of the ultrasound sensor signal constant, which could be realized in an otherwise known manner, for example by means of a phase locked loop.

In order to further improve the noise immunity of the inventive device, in this regard a further preferred embodiment provides that the means be allocated to the mixer and detector means for setting a pulse breadth (pulse width) of the periodic pulse signal for demodulation. This also makes it possible to improve noise suppression, and thereby in particular to effectively reduce the undesired pressure fluctuations in the ambient air found to be problematic. In particular, this is because lengthening the pulse width leads to an improved reduction of higher frequency signal components.

As a result, the present invention surprisingly and effectively yields an improved ultrasound Doppler motion sensor assembly with respect to its operating behavior and noise immunity, which effectively increases the insensitivity to feedback between the transmission and reception means, an insensitivity to influence by adjacent motion sensor units in the same space, and an insensitivity to pressure disturbances or the like in the ambient air, all while retaining the same favorable operating and manufacturing characteristics.

BRIEF DESCRIPTION OF THE DRAWINGS

Additional advantages, features and details of the invention may be gleaned from the following description of preferred exemplary embodiments, as well as based on the drawings; the latter show in FIG. 1 a schematic block diagram of the ultrasound Doppler motion sensor assembly according to the invention in a first preferred embodiment of the present invention;

FIG. 2 an exemplary signal diagram for illustrating a continuous transmission signal, a reception signal, a pulsed periodic signal for demodulation and a (demodulated) Doppler signal that arises during an exemplary movement as directly contrasted as respective amplitudes over time.

DETAILED DESCRIPTION

Figure 1:
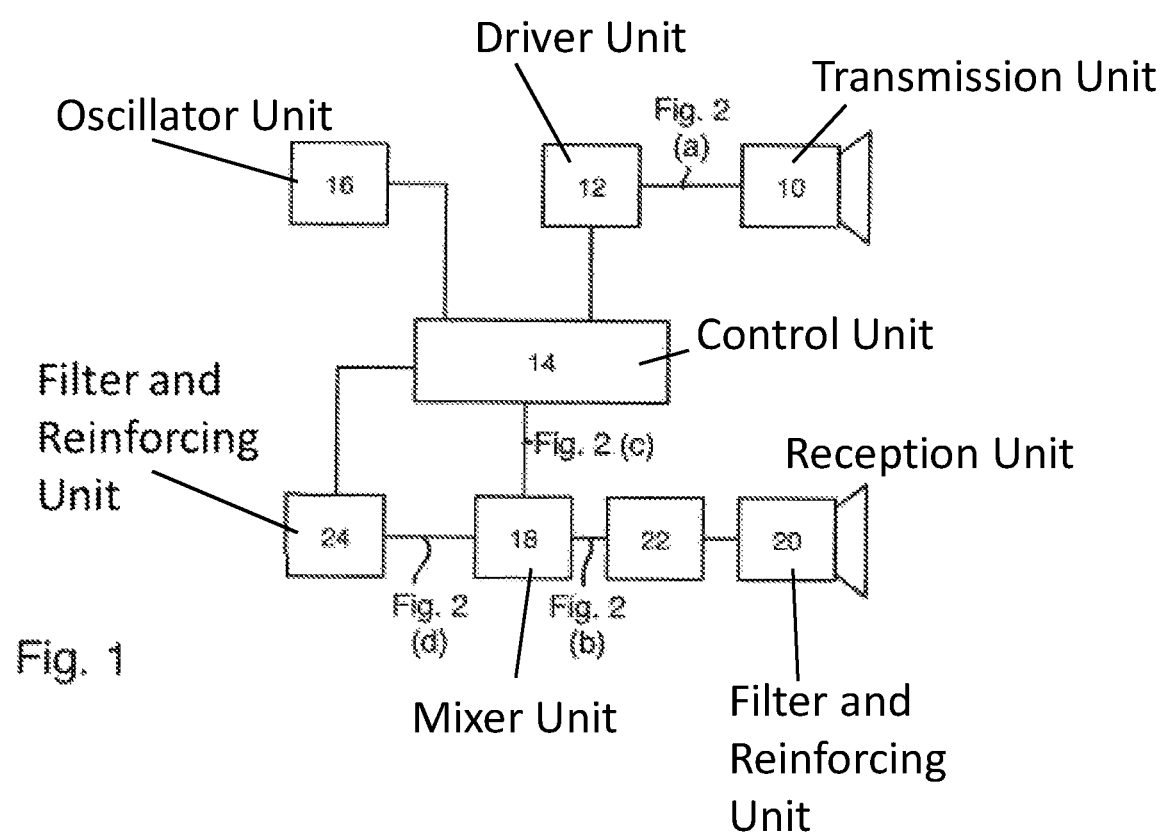

The device shown on FIG. 1 in a schematic block diagram in a first exemplary embodiment comprises a conventional ultrasound generator (ultrasound transmitter) 10 on the transmitter side, which is exposed to a sinusoidal, continuous signal (CW) by a driver unit 12, with a typical transmission frequency measuring 40 kHz. The transmission signal is kept constant on the driver side in terms of a phase locked loop (PLL) realized there.

Connected upstream from the driver unit is a central control and filter unit 14, which receives a stabilization signal obtained from a quartz oscillator unit 16, and also relays it to the driver unit 12. As a consequence, the signal of the oscillator unit (stabilization unit) 16 is also used to generate a 40 kHz pulse signal within the framework of the assembly 14 realized by means of a microprocessor unit.

This pulse signal, once again also phase shifted in the unit 14 in relation to a phase of the transmission signal 14 by digital means, such as suitable programming within the framework of unit 14, is then applied to a (discretely structured) mixer unit 18, which in an otherwise known manner demodulates the phase-shifted pulse signal on a non-linear characteristic curve with an ultrasound reception unit 20 having a downstream filter and reinforcing unit 22 (also realized here in particular is a band filter functionality adjusted to typical movement patterns and corresponding Doppler frequencies), so that the output of the mixer unit 18 has applied to it a movement detection signal, which corresponds to the movement detected within the framework of the superposed Doppler frequency of the reception signal, is to be further processed within the framework of a filter and reinforcing unit 24 and then to be evaluated within the framework of the central control unit 14.

As a result of the phase shift, the signals radiated (fed back) by the transmission unit into the reception unit 20 advantageously are left out unconsidered, as can also be discerned in particular in the signal diagram on FIG. 2.

The uppermost diagram according to FIG. 2 (a) initially shows the continuous ultrasound transmission signal, as applied by the driver unit 12 to the transmission unit 10, and then emitted into the detection range of the device. This is denoted on FIG. 1 by the indication to FIG. 2 (a). In like manner and on the same time scale (as otherwise also applies to the additional curves on FIG. FIG. 2), the partial figure (b) shows the signal present on the reception side before the mixer unit 18, shifted in phase and equal in frequency relative to the transmission signal (a), wherein, starting at roughly the middle of the time window depicted along the horizontal on FIG. 2, the reception signal (b) reveals a Doppler-induced shift, initially in the leftward phase, and then in the rightward phase in the time axis. The partial figure (c) on FIG. 2 illustrates the scanning signals at the input of the mixer 18, which are generated by the central unit 14. Finally, partial figure (d) presents the result of demodulation before the reinforcing unit 24; as evident, starting at about half the time window depicted on FIG. 2, the detected movement discernible in the Doppler shift on partial figure (b) is demodulated toward the useful signal according to partial figure (d), while no demodulation signal relevant for the evaluation arises in the first time period.

Not shown on the figures is the option to vary a pulse of the pulses fed to the mixer unit 18 via a suitable functionality within the framework of the control unit 14.

The device shown can then be built into a housing suitable for mounting in a wall or ceiling, wherein it is further preferable that both the transmission and reception unit be provided in a shared housing, suitably adjacent and mechanically decoupled, and be or can be aligned toward a motion detection space. An especially preferred use of this embodiment then lies in lighting control, wherein suitable lamps can then be provided either directly on or in the sensor housing, so as to thereby realize an overall unit, wherein a detection and activation signal of the sensor assembly depicted on FIG. 1 can alternatively then be fed to a lamp body provided spatially separate therefrom via a suitable hardwired or wireless connection so as to activate the lighting.

The invention claimed is:

1. An ultrasound Doppler motion sensor device with
    transmission means (10, 12) designed to emit a continuous ultrasound transmission signal in a detection space,
    ultrasound reception means (20, 22) for detecting the ultrasound transmission signal reflected by a detection object as a detection signal, and
    mixer and detector means (14, 18) for mixing the ultrasound transmission signal or a signal derived from it with the reception signal and for demodulating the reception signal and generating a motion detection signal, wherein
    the mixer and detector means has allocated to it means (14) for adjustably generating a phase shift greater than 0° between a phase of the ultrasound transmission signal and a periodic pulse signal applied to the mixer and detector means for sampling the reception signal.

2. The motion sensor device according to claim 1, wherein said means for generating the phase shift have an integrated control unit realized by a microprocessor or microcontroller unit.

3. The motion sensor device according to claim 2, wherein said control unit has allocated to it vibration generating means (16).

4. The motion sensor device according to claim 3, further comprising means for predetermined and/or adjustable detuning of a stabilization and/or oscillation frequency of the stabilizer and/or oscillator means.

5. The motion sensor device according to claim 1, wherein said means for generating the phase shift have allocated to them means for detecting a zero crossing of the periodic, continuous ultrasound transmission signal.

6. The motion sensor device according to claim 1, wherein said transmission means comprise means for keeping the phase of the ultrasound transmission signal constant.

7. The motion sensor device according to claim 1, wherein said mixer and detector means have allocated to them means for setting a pulse width of the periodic pulse signal.

8. The motion sensor device according to claim 1, wherein said ultrasound Doppler motion sensor assembly is provided in a sensor housing for mounting on a ceiling and/or wall in an interior space.

9. Use of the ultrasound Doppler motion sensor device according to claim 1 to control lighting, wherein a lamp arrangement is directly adjacent to said motion sensor device and/or allocated in a shared lamp housing,
    or the lamp arrangement can be provided and/or mounted remote from the motion sensor device provided in a separate sensor housing.

10. The motion sensor device according to claim 2, wherein the integrated control unit is programmable.

11. The motion sensor device according to claim 3, wherein the vibration generating means is an electronic stabilizer and/or oscillator means realized by a quartz assembly.

12. The motion sensor device according to claim 5, wherein the means for detecting comprises means for detecting a zero crossing of a sinusoidal continuous ultrasound transmission signal.

13. The motion sensor device according to claim 6, wherein the means for keeping the phase of the ultrasound transmission signal constant is realized with a phase locked loop.

* * * * *